April 13, 1965     E. P. FRANQUI     3,177,763
PHOTO-PRINTING OR PHOTO-ENGRAVING APPARATUS
FOR FULL LINE AND HALF TONE PLATES
Filed Oct. 3, 1960
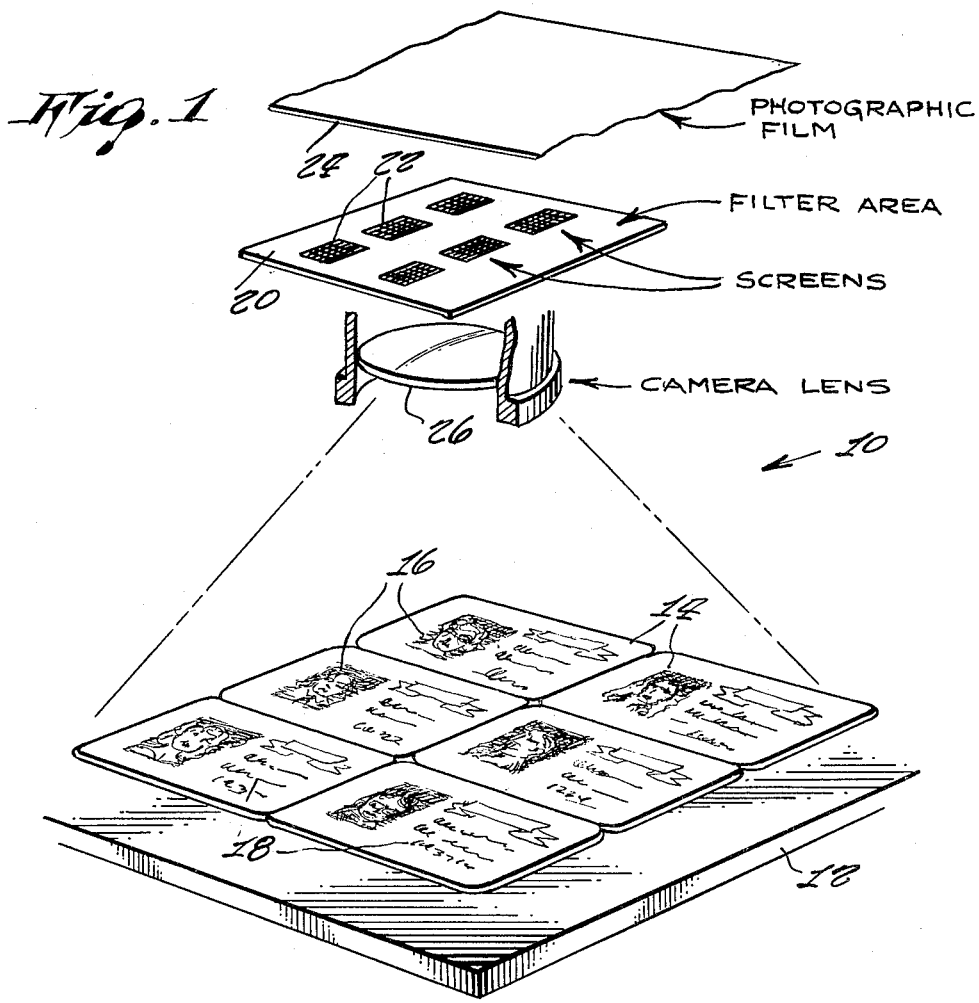
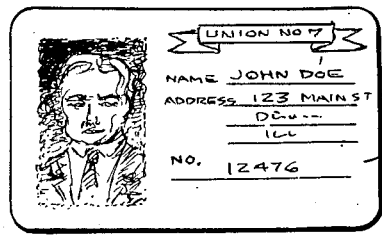
INVENTOR.
EDUARDO PEGUDO FRANQUI
ATTORNEY

3,177,763
PHOTO-PRINTING OR PHOTO-ENGRAVING APPARATUS FOR FULL LINE AND HALF TONE PLATES

Eduardo Pegudo Franqui, Miami, Fla. (% Eugene Molinet, Room 352, 50 Church St., New York 7, N.Y.)
Filed Oct. 3, 1960, Ser. No. 60,082
2 Claims. (Cl. 88—24)

This invention relates to photo-printing or photo-engraving and, more particularly, to apparatus for photo-printing or photo-engraving full line and half tone plates in a single operation.

It is an object of the present invention to provide a novel apparatus for accurately photo-printing or photo-engraving original copy made up of half tone and full line segments which will substantially minimize the number of operations ordinarily required and the time usually expended therefor.

Still a further object of the present invention is to provide a photo-print or photo-engraving apparatus for full line and half tone plates which will substantially reduce the cost of production, and which will enable conventional apparatus to be used without extensive alteration.

A still further object of this invention is to enable half tone and full line areas to be photographically reproduced in a single exposure and without resorting to photographic combinations or composites.

All of the foregoing and still further objects and advantages of this invention will become apparent from a study of the following specification, taken in conjunction with the accompanying drawing, wherein:

FIGURE 1 is an exploded perspective view of photographic apparatus employing photo-engraving equipment made in accordance with the present invention with such equipment shown in actual use; and FIGURE 2 is a plan view of a photo-engraved plate made in accordance with the present invention.

In the following description, the term "photo-processing" is intended to include all forms of photo-printing and photo-engraving.

Referring now to the drawing, apparatus 10 for photo-processing full line and half tone plates 14 made in accordance with the present invention is shown to include a base panel 12 upon which one or more pieces of copy 14 to be photo-processed is supported. It is to be noted that each such piece or copy 14 includes full line copy 18 and half tone material 16. Ordinarily, the photo-processing of a printing plate for making reproductions of such materials requires two separate photographing steps; one for photographing the full line material, and one for photographing the half tone material.

In accordance with the present invention, a filter 20 is further provided with individual grid areas 22, each having a screen of the type commonly used for photo-processing. All of the filter 20, except for the screen areas 22, has a light transmitting factor which will correlate the photographing of the line areas 18 of the copy 14 with the screen areas 16 thereof, thus enabling all of the parts of the copy 14 to be photographed in a single exposure. Each of the screen areas 22 is inserted into pre-cut position upon the filter 20 in the exact position corresponding to the half tone areas 16 of the copy 14 being reproduced. Thus, by placing the filter 20 between the lens 26 and the photosensitized material 24, in proper alignment with the copy board 12, and copy 14 arranged thereupon, a single exposure may be used to expose the photographic film for both the full line and half tone areas of the copy 14. The photographic plate resulting from such exposure may then be processed in a conventional manner in order to produce a plate which may also be used for printing purposes, so as to produce a finished product, such as that shown in 28 in FIGURE 2.

It will now be recognized that this apparatus substantially reduces the number of steps ordinarily required for photo-engraving such material, and provides for maximum accuracy, convenience, and reduction in cost and most favorable circumstances.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. For use in a photo-processing apparatus including a plate for supporting original copy material, and a camera spacedly positioned with respect thereto, said original copy material including separate full line and half tone areas, and said camera having lens means and photographic film disposed rearwardly of said lens means; a transparent light filtering panel disposed between said lens means and film, said light filtering panel having a cut-out portion, a grid positioned in said cut-out, said cut-out and grid being dimensional and positioned in the light filtering panel so as to correspond to the half tone area in the original copy material and said light filtering panel having predetermined light transmitting factor which will complete the simultaneous photographing of the full line areas and the half-tone areas of the original copy material in a single exposure.

2. Apparatus as set forth in claim 1, wherein said original copy material includes a plurality of originals, each having full line and half-tone areas, and each arranged in a predetermined position on said supporting plate, and said light filtering panel having a like plurality of cut-outs and grids positioned therein, there being a grid for each half-tone area of each original and said grids being arranged in a predetermined position such that in the proper placement of the light filtering panel within the camera, each grid will be in registration with a corresponding half-tone area of an original and the ungridded portions of said light filtering panel will be in registration with the full line areas of said originals.

References Cited in the file of this patent
UNITED STATES PATENTS

| | | |
|---|---|---|
| 960,301 | Fitz | June 7, 1910 |
| 1,254,579 | Collet | Jan. 22, 1918 |
| 1,734,780 | Simjian | Nov. 5, 1929 |
| 1,742,811 | Hopkins | Jan. 7, 1930 |
| 2,406,770 | Huebner | Sept. 3, 1946 |
| 2,665,984 | La Tourneau et al. | Jan. 12, 1954 |